(12) United States Patent
Finger et al.

(10) Patent No.: US 7,803,311 B2
(45) Date of Patent: Sep. 28, 2010

(54) AIR RECIRCULATION IN A BLOW MOLDING PROCESS

(75) Inventors: Dieter Finger, Neutraubling (DE); Helmut Asbrand, Bad Abbach (DE)

(73) Assignee: Krones AG, Neutraubling (DE)

( * ) Notice: Subject to any disclaimer, the term of this patent is extended or adjusted under 35 U.S.C. 154(b) by 181 days.

(21) Appl. No.: 11/661,458

(22) PCT Filed: Aug. 26, 2005

(86) PCT No.: PCT/EP2005/009222

§ 371 (c)(1),
(2), (4) Date: May 29, 2007

(87) PCT Pub. No.: WO2006/024462

PCT Pub. Date: Mar. 9, 2006

(65) Prior Publication Data

US 2009/0039569 A1 Feb. 12, 2009

(30) Foreign Application Priority Data

Aug. 31, 2004 (DE) .................. 10 2004 041 973

(51) Int. Cl.
*B29C 49/00* (2006.01)
(52) U.S. Cl. .............. 264/526; 264/525; 264/529; 264/531; 425/530; 425/535
(58) Field of Classification Search ............ 264/526, 264/525, 529, 531, 532; 425/535
See application file for complete search history.

(56) References Cited

U.S. PATENT DOCUMENTS

| 4,488,863 | A | * | 12/1984 | Collette | 425/530 |
| 5,648,026 | A | * | 7/1997 | Weiss | 264/37.16 |
| 6,635,216 | B2 | * | 10/2003 | Dundas et al. | 264/525 |
| 2004/0173949 | A1 | * | 9/2004 | Storione et al. | 264/529 |

FOREIGN PATENT DOCUMENTS

| DE | 43 40 290 A1 | 6/1995 |
| DE | 43 40 291 A1 | 6/1995 |
| DE | 199 09 307 A1 | 9/1999 |
| EP | 0 754 537 B1 | 1/1997 |
| WO | WO 03/009993 A1 | 2/2003 |

* cited by examiner

*Primary Examiner*—Eric Hug
*Assistant Examiner*—Jacob Thomas Minskey
(74) *Attorney, Agent, or Firm*—Marshall, Gerstein & Borun LLP

(57) ABSTRACT

A device for molding a container from a thermoplastic material in which a heated parison is pre-blown by supplying low-pressure blowing air from a low-pressure air supply and then the blow molding is completed by subsequent supply of high-pressure blowing air and in which the high-pressure blowing air flowing out of the container that has been completely blow molded is supplied to the low-pressure air supply via a reversing mechanism during a transitional phase. A pressure monitoring is performed in the area of the low-pressure air supply and in which, after the transitional phase, the container is vented with respect to an ambient pressure whereby the pressure in the low-pressure air supply is controlled by varying the duration of the transitional phase.

13 Claims, 3 Drawing Sheets

AIR RECIRCULATION IN A BLOW MOLDING PROCESS

CROSS-REFERENCE TO RELATED APPLICATION

This is the U.S. national stage under 35 U.S.C. §371, of international application no. PCT/EP2005/009222, having an international filing date of Aug. 26, 2005, and claims priority to German application no. 10 2004 041 973.6 filed on Aug. 31, 2004.

FIELD OF THE DISCLOSURE

The invention relates to a method and device for air recirculation used in blow molding operations for containers, such as beverage bottles.

BACKGROUND OF THE DISCLOSURE

Such methods and devices are used especially for molding containers such as canisters or bottles. They are used in particular in the stretch blow molding technique where bottles and the like are manufactured for the food industry and especially for the beverage industry. These methods and devices are characterized by very high consumption of blowing media because they work with pressures of up 40 bar. Therefore, there will be repeated attempts to utilize the blow molding media as optimally as possible through various methods and devices to minimize consumption.

Therefore, several of these methods and devices are already known from the state of the art. U.S. Pat. No. 4,488,863 describes a blow molding device with which an object is pre-molded first at a low pressure and then completely blow-molded at a higher pressure. Following the finished blow molding, a valve is opened so that the finished blowing air which is under a higher pressure is returned to the pre-blowing air via a recirculation line. The length of time this valve is open remains constant. The storage device containing the pre-blowing air is provided with a pressure regulating valve so that the pre-blowing air can escape to the outside through the pressure regulating valve and a silencer if the pressure increases too much. When this recirculation process is concluded, the finished blow-molded container which is still under a residual pressure is released to the environment via another valve and a sound absorber. This device has the disadvantage that it requires an increased structural complexity. The process times are also slower because the valve is always opened for a constant period of time for recirculation of the pre-blowing air. When there is enough air in the pre-blowing air storage mechanism, then the recirculated air is directed to the outdoors via the pre-blowing air storage mechanism. A partial depressurization of the blow-molded container then takes place more or less via the preliminary blow molding storage mechanism. Furthermore, with this device only inaccurate regulation of the pre-blowing pressure is possible.

Unexamined German Patent DE 4 340 291 A1 discloses a method in which a container is molded from a thermoplastic material by supplying low-pressure pre-blowing air and high-pressure main blowing air. After pre-blowing the container, high-pressure blowing air is supplied to the low-pressure air supply during a transitional phase. This is accomplished via a reversing mechanism. To limit pressure fluctuations in the low-pressure air supply, pressure monitoring is provided in order to limit the maximum low-pressure air supplied. Following that, the residual air still in the container is released to the environment. Furthermore, this unexamined patent specification also discloses a device that operates according to this method.

The aforementioned devices and methods have disadvantages, however. The recirculation of blowing air leads to an increase in the pre-blowing pressure in the supply line. The recirculated air is consumed in neighboring blowing stations, which is why a pressure equilibrium is established. However, the pressure equilibrium depends greatly on the recirculation time—i.e., the duration of the transitional phase—which should be as long as possible in the interest of cost reduction, although that results in a high pre-blowing pressure and consequently a reduced bottle quality. To find the optimum middle path here, a high measure of experience and extensive knowledge of the processes taking place in the machine are required. For this reason, many air recirculation systems are hardly acceptable to the machine operating personnel.

SUMMARY OF THE DISCLOSURE

Therefore, in addition to optimizing air consumption, another object of the present disclosure is to provide a largely automatic method which will ensure a stable process with a uniform bottle quality while at the same time having the highest possible recirculation factor. In addition, another object of the present disclosure is to provide a machine whose use is facilitated by a largely automatic regulation of the air recirculation, bringing about optimal air consumption.

The containers made of a thermoplastic material may be any hollow objects which are intended for storing liquid filling material in particular. These may be, for example, bottles, canisters or the like. The low-pressure air supply from which low-pressure blowing air is blown into the parison may be a line which is directly connected to a compressor or it may be an air storage mechanism which is in turn supplied with air by a compressor. If the low-pressure air supply is designed as a storage mechanism, it may be a ring channel storage mechanism in particular in the case of rotary carousel machines.

The transitional phase refers to the period of time during which high-pressure blowing air is flowing from the completely blown container into the low-pressure air supply. This transfer of high-pressure blowing air to the low-pressure air supply takes place by operating a reversing mechanism which is a valve in particular. This valve has at least two switch states. In the one switch state, low-pressure blowing air flows from the low-pressure blowing air supply through a line into the container that is to be shaped. In the other switch state, preferably at least a portion of the line described previously is used to allow the high-pressure blowing air to flow out of the container into the low-pressure air supply.

In the area if the low-pressure air supply, pressure monitoring is provided, detecting current values for the actual pressure. It is especially advantageous if the pressure monitoring takes place directly in the low-pressure air supply. Venting of the container after the transitional phase with respect to an ambient pressure is advantageously performed with the help of a muffler. Pressure control is performed in the low-pressure air supply by varying the duration of the transitional phase. A value for the duration of the transitional phase in startup of the machine is set in startup of the machine, whereas it is varied by the control and regulating means in the course of operation of the machine, adapting it to the pressure conditions in the low-pressure air supply.

The pressure control is advantageously performed as follows. In the low-pressure air supply such as a low-pressure storage mechanism, there is a pressure pickup which detects an actual value of the pressure. This actual value is relayed to a control and regulating unit. The control and regulating unit may be situated either near the low-pressure air supply or it may be designed as part of the central machine control. The actual value may be relayed from the pressure pickup to the control and regulating unit in either a wireless method or a wired method. Then the actual value of the pressure of the low-pressure air supply is compared in the machine control with the setpoint value defined by the user. This comparison, i.e., the information about whether the pressure in the low-pressure air supply is too high or too low, is used by the control and regulating unit to ascertain the duration of the transitional phase. The quantity thereby obtained for the duration of the transitional phase is converted by the control and regulating unit into a signal that is relayed to the reversing mechanism. The reversing mechanism in turn opens the recirculation from the bottle filled with finished blowing air to the low-pressure air supply, depending on the value thus received. If the actual pressure value is too low, then the transitional phase is lengthened to ensure a higher return flow of blowing air into the low-pressure air supply. If the actual pressure value is higher than the setpoint value, the transitional phase is shortened. At the startup of the machine, the duration of the transitional phase is fixed, whereas it is adapted by the control and regulating unit in the course of operation to obtain an optimal operating state with the highest possible blowing air recirculation rate and the most accurate possible compliance with the setpoint value of the low pressure.

The device for molding a container from a thermoplastic material is in particular a stretch blow molding machine, preferably a rotary stretch blow molding machine. In the blow molding operation, the parison which is inserted into the blow molding station after being heated is additionally drawn. The drawing operation is performed by a drawing mandrel that is operated mechanically (e.g., by means of a control cam). The drawing mandrel is advantageously operated with compressed air and supplied via the low-pressure air supply. The high-pressure blowing air supply and the low-pressure air supply are preferably designed as a ring channel storage mechanism, especially in the case of the rotary stretch blow molding machine.

The reversing mechanism, which is located in the area of a connecting element between the blow molding station and the blowing air supply, may be designed as a control cam which is equipped with multiple air grooves and is subdivided into segments with different pressures acting on them. However, the reversing mechanism is preferably a valve, in particular a pneumatic or electromagnetic valve. The reversing mechanism may switch between at least two paths: during the pre-blowing phase, low-pressure air is passed from the low-pressure air storage mechanism via the reversing mechanism into the container to be molded by blow molding. If the main blowing phase begins, high-pressure blowing air is directed into the container that is to be completely blow molded. If the main blowing phase is ended, the reversing mechanism switches again to thereby reopen the connection from the low-pressure air media storage mechanism to the molded container. Since the pressure in the container is now higher than the pressure in the pre-blowing media storage mechanism, the compressed air flows from the container into the storage mechanism. However, this continues only until the reversing mechanism is closed. The blow molding operation with the steps of pre-blowing and finished blowing is thus ended so that the residual air still in the container can be released to the environment via a silencer.

The low-pressure air supply and/or the low-pressure air media storage mechanism contains an element for determining the pressure, said element being connected to a control and regulating unit and supplying this unit with data about the actual pressure status. If the control and regulating unit recognizes, based on the signal received by the element for determining the pressure, that the pressure in the low-pressure air media storage mechanism is too low, then it will lengthen the period of time during which the reversing mechanism is switched so that there is a connection from the container to the low-pressure air supply. When the pressure is too high, the control and regulating unit will shorten the switching time of the reversing mechanism.

BRIEF DESCRIPTION OF THE DRAWINGS

A preferred embodiment of the present disclosure will now be explained in greater detail with reference to FIGS. 1-3 in which.

DETAILED DESCRIPTION OF THE DISCLOSURE

Figure 1:
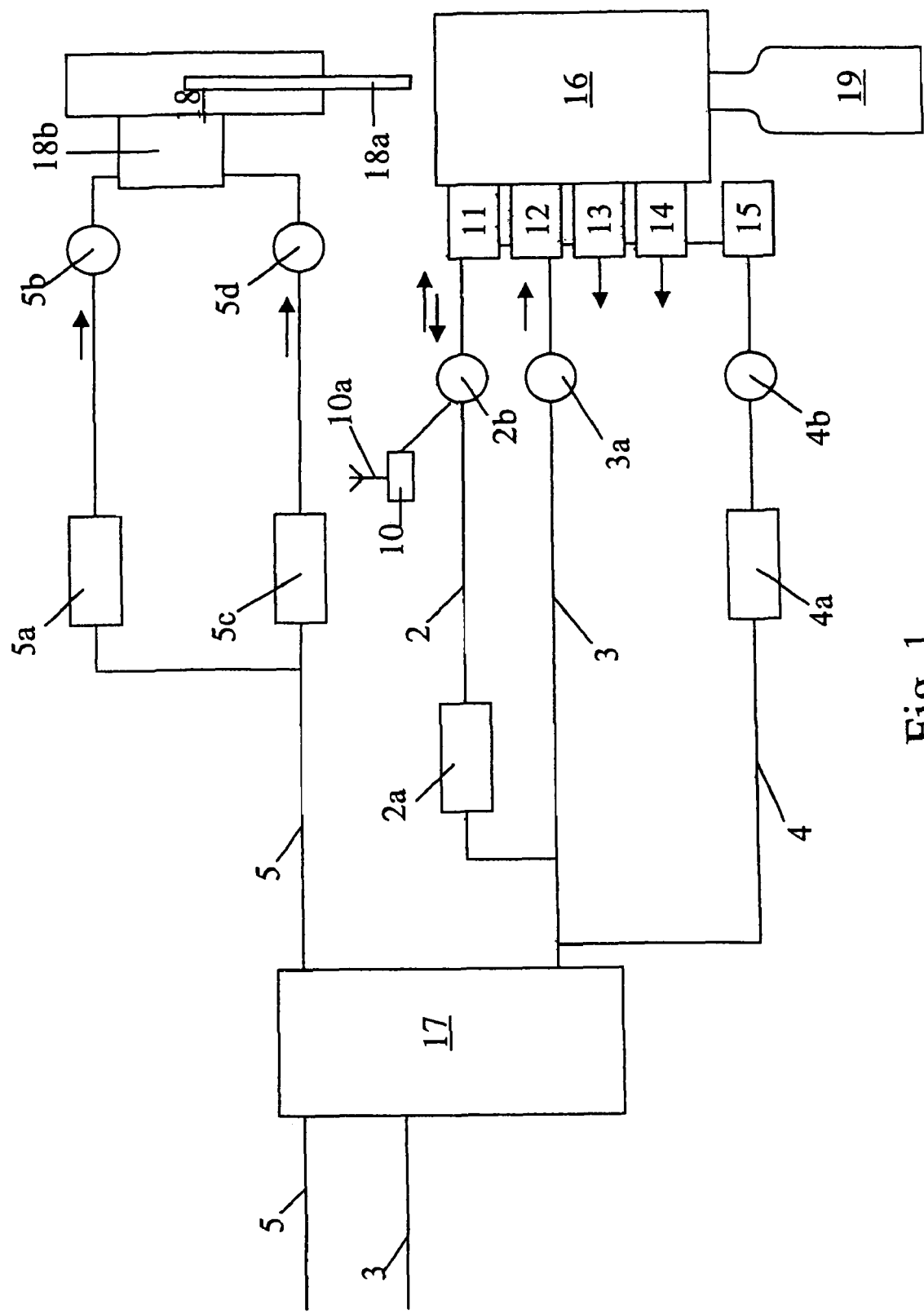
FIG. 1 shows a schematic diagram of the air distribution in a stretch blow molding machine.

FIG. 1 shows an air distributor 17 with an inlet for a low-pressure air supply 5 and an inlet for a high-pressure blowing air supply 3. In the direction of the machine, the air distributor 17 has two outlets for the low-pressure air and the high-pressure air. The air distributor 17 has the task of bringing the blowing air from a stationary part of the machine into the rotating part of the machine. Downstream from the air distributor 17, the high-pressure blowing air is divided among three lines (2, 3, 4). The high-pressure blowing air distributed at 40 bar, for example, by the air distributor 17 into the three lines flows in line 2 first through a pressure regulator 2a that reduces the pressure to 16 bar, for example. Then the air flows further into a low-pressure media storage mechanism 2b which is designed here as a ring line. The pressure in this storage mechanism 2b is monitored by a pressure pickup 10. From the low-pressure media storage mechanism 2b, the air flows through the blowing nozzle 16 into the container 19 that is to be molded and is therefore pre-blown to the parison stage when the pre-blowing valve 11 is opened. The air which flows from the air distributor 17 via the high-pressure blowing air supply 3 into the high-pressure media storage mechanism 3a is under a pressure of 28 bar, for example, and is intended for finished blowing of the container 19. It therefore flows through the finished blowing valve 12 and the blowing nozzle 16 into the container 19 intended for this purpose after the pre-blowing valve 11 has been closed. If the finished blowing phase is concluded, the transitional phase begins during which the pre-blowing valve 11 is opened several times so that the finished blowing air can flow from the container 19 through the blowing nozzle 16 and the pre-blowing valve 11 into the low-pressure media storage mechanism 2b. The possible directions of flow of the blowing air are represented by arrows FIGS. 1 and 2 while the pressure in the low-pressure media storage mechanism 2b is monitored continuously by the pressure pickup 10 which relays the prevailing values via a transmission unit 10a to the central machine control unit (not shown here). On the basis of the pressure conditions in the low-pressure media storage mechanism 2b, the central machine control calculates an optimum duration for the transitional phase and thus specifies the opening and closing points in time of the pre-blowing valve 11 in recirculation of the finished blowing air.

The air flowing from the air distributor 17 into the control air supply 4 is reduced to a pressure of 10 bar, for example, by a pressure regulator 4a and then sent to the control air media storage mechanism 4b. The control air is required to actuate the pre-blowing valve 11, the finished blowing valve 12 and the two exhaust valves 13 and 14.

Once the transitional phase with the finished blowing air recirculation from the container 19 into the low-pressure media storage mechanism 2b is concluded, the two exhaust valves 13 and 14 are actuated to release the remaining air which is still in the container 19 into the environment via a muffler (not shown here).

The low-pressure air is divided into two substreams downstream from the air distributor 17. This air which is under a pressure of 10 bar, for example, is reduced to a pressure of 4 bar, for example, by two pressure regulators (5a, 5c). The reduced low-pressure air flows into its respective low-pressure media storage mechanisms 5b and 5d, which are likewise designed as ring channels. This low-pressure air serves to control the drawing mandrel 18a in the drawing unit 18, whereby the air from a storage mechanism (5b) is used for the downward movement of the drawing mandrel and the air from the other storage mechanism (5d) is used for the upward movement of the drawing mandrel which is activated during the pre-blowing phase.

Figure 2:
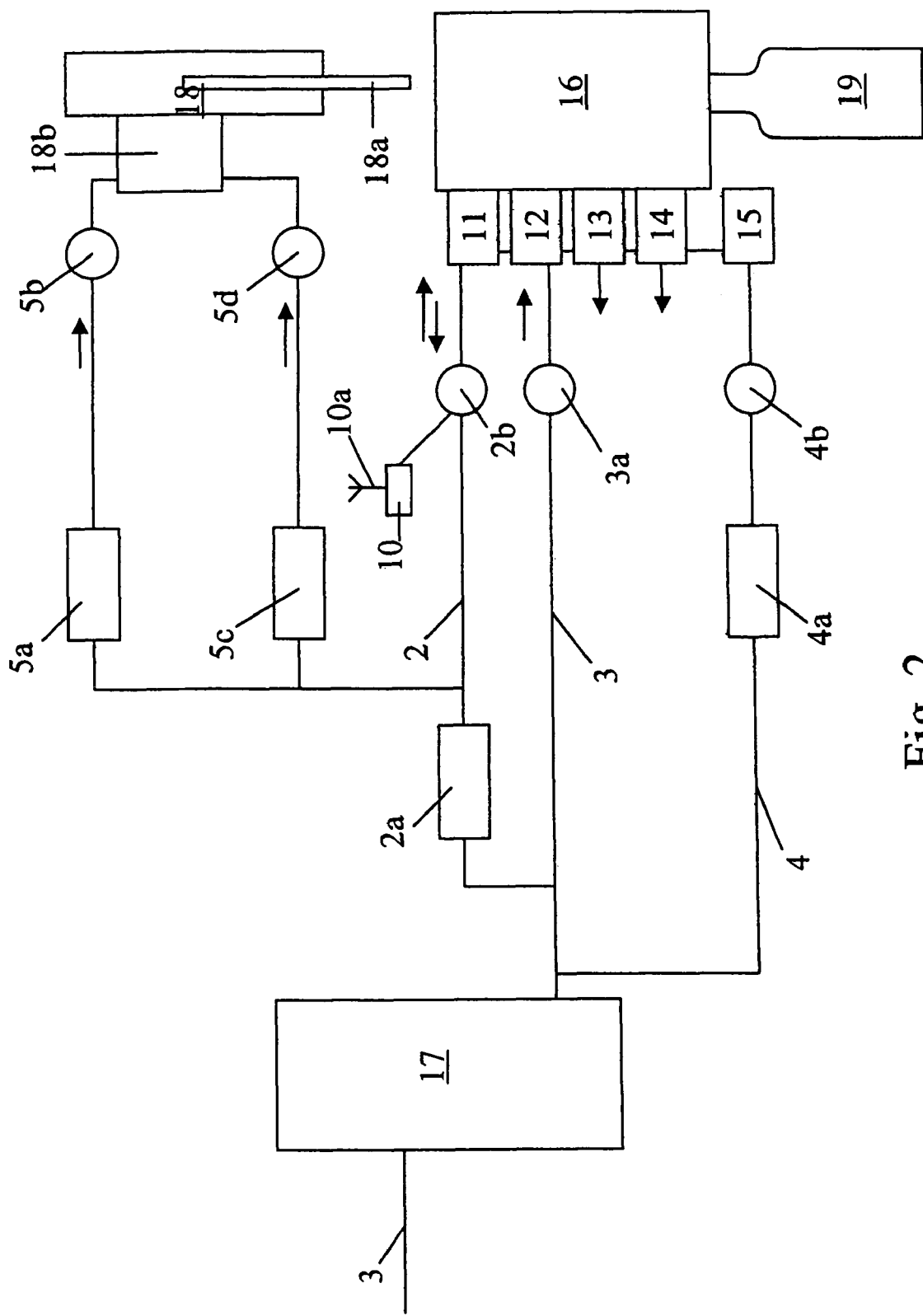
FIG. 2 shows a schematic diagram of the air distribution in a stretch blow molding machine without a separate low-pressure air supply and FIG. 3 shows a basic diagram of the pressure curve of a blow molding operation with blowing air recirculation and a blow molding operation without blowing air recirculation.

FIG. 2 shows the same schematic diagram as FIG. 1, with the difference being that there is no separate low-pressure air supply for the drawing unit via the air distributor 17. Instead, the supply of compressed air to the drawing unit 18 is accomplished via the low-pressure air supply 2.

Figure 3:
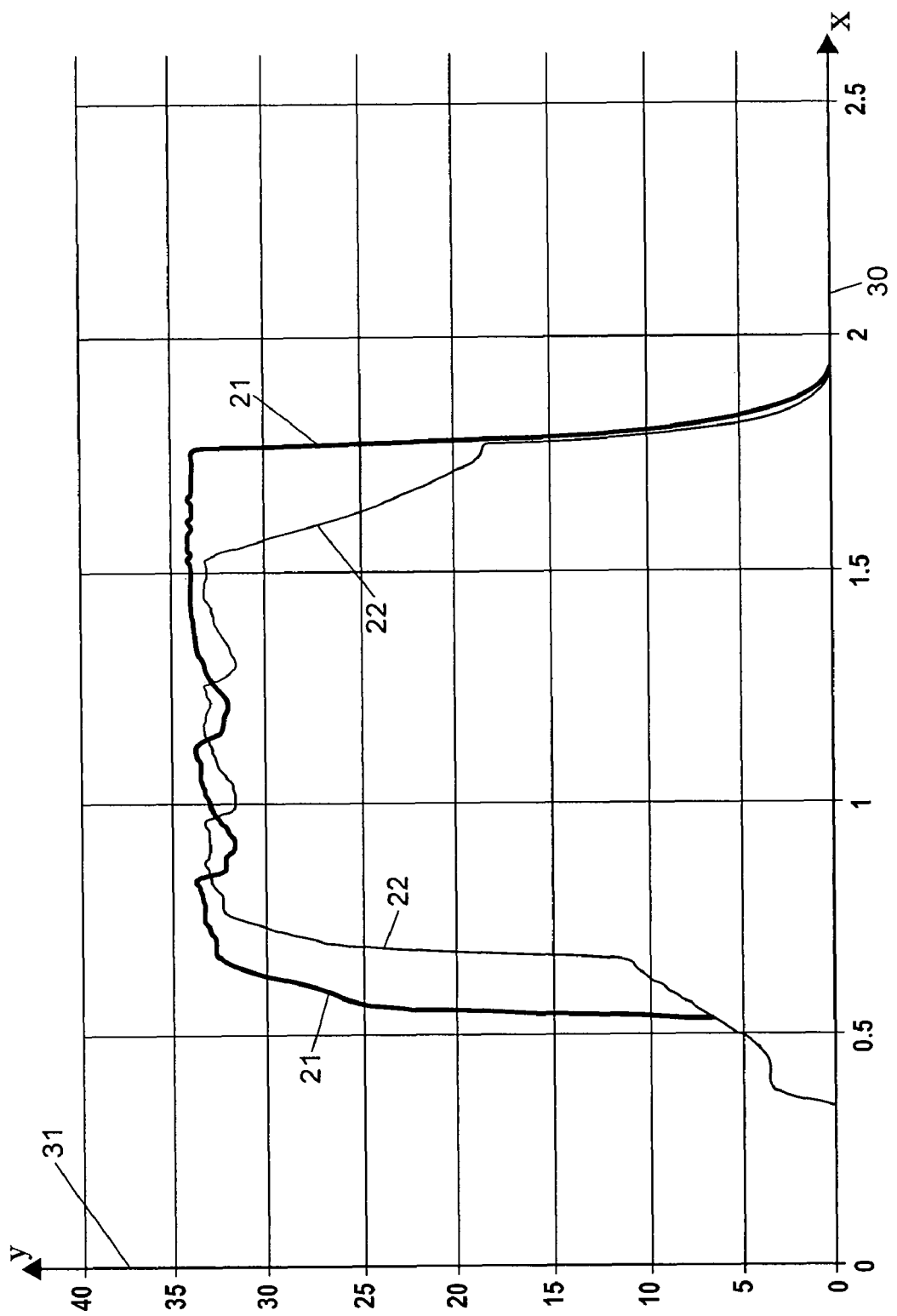

FIG. 3 shows two curves, where curve 21 shows the pressure curve of a blow molding operation without recirculation of blowing air and curve 22 represents the pressure curve of a blow molding operation with recirculation of blowing air. The X-axis 30 in the diagram indicates the time in seconds while the Y-axis 31 indicates the pressure in bar. If we consider the curve according to the traditional process 21, it can be seen that the finished blowing phase begins at approximately 0.5 second and ends at approximately 1.7 second due to the opening of the exhaust valves 13 and 14.

If we compare the pressure curve of the standard process with that of the process according to curve 22, it can be seen that the start of the finished blowing phase occurs later so that the proportion of the recirculated blowing air in relation to the total air consumption is as high as possible. The amount of air thereby saved, which is influenced to a significant extent by the start of finished blow molding, depends on many factors, e.g., the bottle shape and size. The larger the process window allowed, the greater the possible savings of compressed air.

The finished blow molding pressure in container 19 drops at an earlier point in time because after approximately 1.5 seconds, the pre-blowing valve 11 is opened to initiate the transitional phase and thus begin the recirculation of the blowing air. Here again, the process is terminated at approximately 1.7 seconds by closing the pre-blowing valve 11 and opening the exhaust valves 13 and 14.

We claim:

1. Method for molding a container from a thermoplastic material, comprising pre-blowing a heated parison by supplying low-pressure blowing air from a low-pressure air supply, completing the blow molding by subsequent supply of high-pressure blowing air, supplying the high-pressure blowing air flowing out of the completely blow-molded container to the low-pressure air supply via a reversing mechanism during a transitional phase, performing a pressure monitoring in the area of the low-pressure air supply, after the transitional phase venting the container with respect to an ambient pressure, and controlling the pressure in the low-pressure air supply by varying the duration of the transitional phase, the method further comprising detecting an actual pressure value in the low-pressure air supply, and ascertaining the duration of the transitional phase by comparison of the actual pressure value with a setpoint pressure value for the low-pressure air supply to create a low-pressure equilibrium in the area of the setpoint value, converting the quantity of the duration of the transitional phase thereby obtained into a signal that is relayed to the reversing mechanism, and switching the reversing mechanism between a first switching state, wherein the low-pressure blowing air flows from the low-pressure blowing air supply into the container, and a second state, wherein the high-pressure blowing air is allowed to flow out of the container into the low-pressure air supply, on the basis of the relayed signal.

2. Method according to claim 1, and pre-setting the duration of the transitional phase at the start of the machine.

3. Method according to claim 1, and adapting the duration of the transitional phase on the basis of the constant comparison of the actual pressure value with the setpoint pressure values of the low-pressure air supply after startup.

4. Device for molding a container from a thermoplastic material, comprising at least one blow molding station provided to accommodate a heated parison, the blow molding station provided with a high-pressure blowing air supply for expansion of the parison, the blow molding station having at least one component which is connected to a low-pressure air supply in which low-pressure air is made available in the area of the blow molding station for activation, the low-pressure air being at a lower pressure level than the high-pressure blowing air stored in the area of the high-pressure blowing air supply, a reversing valve installed in the area of a connecting element that connects the blow molding station to the high pressure blowing air supply, for switching between a first state of directing high-pressure blowing air into the area of the blow molding station during a main blowing phase, and then after the end of the main blowing phase, a second state of developing a connection between the blow molding station and the low-pressure air supply to a blowing air transfer line during a transitional phase, and the blow molding station is connected to an exhaust valve which vents the interior of the container with respect to ambient pressure after the end of the blow molding process, and the low-pressure air supply has an element for detecting the pressure of the low-pressure air and which is connected to a control and regulating unit, with the element supplying the control and regulating unit with data about the actual pressure state, wherein the control and regulating unit is connected to the reversing mechanism and switches the reversing mechanism between the first and second state on the basis of the supplied data, and wherein the control and regulating unit controls the reversing time as a function of the value supplied by the element for detecting the pressure.

5. Device according to claim 4, wherein the device for molding a container is a stretch blow molding machine.

6. Device according to claim 5, wherein the stretch blow molding machines is a rotary stretch blow molding machine.

7. Device according to claim 4, wherein the reversing mechanism involves pneumatic valves.

8. Device according to claim 4, wherein the reversing mechanism involves electromagnetic valves.

9. Device according to claim 4, wherein the low-pressure air supply is at least partially a compressed air storage mechanism.

10. Device according to claim 9, wherein the compressed air storage mechanism is in the form of a ring channel.

11. Device according to claim 4, wherein the control and regulating unit is formed by the central machine control.

12. Device according to claim 4, wherein the data is transmitted to the control and regulating unit by the element for detecting the pressure via a data line.

13. Device according to claim 4, wherein the data is transmitted wirelessly from the element for detecting the pressure to the control and regulating unit.

* * * * *